United States Patent
Abhishek et al.

(10) Patent No.: US 11,916,982 B2
(45) Date of Patent: Feb. 27, 2024

(54) TECHNIQUES FOR SIGNALING MULTIPLE AUDIO MIXING GAINS FOR TELECONFERENCING AND TELEPRESENCE FOR REMOTE TERMINALS USING RTCP FEEDBACK

(71) Applicant: TENCENT AMERICA LLC, Palo Alto, CA (US)

(72) Inventors: Rohit Abhishek, San Jose, CA (US); Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/703,275

(22) Filed: Mar. 24, 2022

(65) Prior Publication Data
US 2023/0144330 A1   May 11, 2023

Related U.S. Application Data

(60) Provisional application No. 63/276,433, filed on Nov. 5, 2021.

(51) Int. Cl.
| | |
|---|---|
| *H04L 65/403* | (2022.01) |
| *H04N 21/4788* | (2011.01) |
| *H04N 21/439* | (2011.01) |
| *H04L 65/75* | (2022.01) |
| *H04L 65/401* | (2022.01) |

(52) U.S. Cl.
CPC .......... *H04L 65/403* (2013.01); *H04L 65/401* (2022.05); *H04L 65/75* (2022.05); *H04N 21/439* (2013.01); *H04N 21/4788* (2013.01)

(58) Field of Classification Search
CPC ..... H04L 65/403; H04L 65/401; H04L 65/75; H04N 21/439; H04N 21/4788
See application file for complete search history.

(56) References Cited

U.S. PATENT DOCUMENTS 10,250,921 B1 *  4/2019  Yang .................. H04N 21/2187
2003/0152106 A1   8/2003  Burmeister et al.
(Continued)

OTHER PUBLICATIONS

Intel, Nokia Corporation. "ITT4RT Permanent Document—Requirements, Working Assumptions and Potential Solutions", Feb. 1-10, 2021. Retrieved on Mar. 22, 2023 from <https://www.3gpp.org/ftp/TSG_SA/WG4_CODEC/TSGS4_112-e/Inbox/Drafts/S4-210200_ITT4RT_Permanent_Document%20v0.10.1.doc> (Year: 2021).*

(Continued)

*Primary Examiner* — Shean Tokuta
*Assistant Examiner* — Juan C Turriate Gastulo
(74) *Attorney, Agent, or Firm* — Sughrue Mion, PLLC

(57) ABSTRACT

A method and a device for signaling multiple audio mixing gains in a teleconference using Real-time Transport Control Protocol (RTCP) feedback. The method includes receiving an input audio stream from a 360-degree video stream, the input audio stream including mixing gains, declaring an RTCP feedback rate for receiving the mixing gains, based on an allocated bandwidth, and signaling the mixing gains using the declared RTCP feedback rate. The mixing gains may include audio gains from the input audio stream and audio gains from overlay audio streams. The RTCP feedback rate used for signaling the mixing gains may be constant or event-based feedback rate.

17 Claims, 7 Drawing Sheets

(56) References Cited

U.S. PATENT DOCUMENTS

| | | | |
|---|---|---|---|
| 2005/0237377 A1* | 10/2005 | Chapweske | H04N 7/15 |
| | | | 348/E7.083 |
| 2006/0104340 A1 | 5/2006 | Walton et al. | |
| 2007/0097987 A1* | 5/2007 | Rey | H04L 65/65 |
| | | | 370/395.52 |
| 2013/0250779 A1 | 9/2013 | Meloche et al. | |
| 2014/0025386 A1 | 1/2014 | Xiang et al. | |
| 2014/0119183 A1* | 5/2014 | Wu | H04L 47/20 |
| | | | 370/235 |
| 2015/0264103 A1* | 9/2015 | Kim | H04L 65/1093 |
| | | | 709/219 |
| 2016/0140978 A1* | 5/2016 | Sharma | H04W 24/02 |
| | | | 370/310 |
| 2016/0295539 A1* | 10/2016 | Atti | H04L 43/087 |
| 2017/0054770 A1* | 2/2017 | Wells | H04L 65/65 |
| 2020/0329088 A1* | 10/2020 | Oyman | H04L 65/1016 |
| 2021/0306594 A1 | 9/2021 | Abhishek et al. | |

OTHER PUBLICATIONS

International Search Report and Written Opinion of the International Searching Authority dated Jul. 8, 2022 in International Application No. PCT/US2022/021965.

Stefan Schmid et al., "QoS based Real Time Audio Streaming on IPv6 Networks", Proceedings of SPIE—The International Society for Optical Engineering, 1998 (13 pages total).

* cited by examiner

TECHNIQUES FOR SIGNALING MULTIPLE AUDIO MIXING GAINS FOR TELECONFERENCING AND TELEPRESENCE FOR REMOTE TERMINALS USING RTCP FEEDBACK

CROSS-REFERENCE TO RELATED APPLICATION

This application is based on and claims priority to U.S. Provisional Patent Application No. 63/276,433, filed on Nov. 5, 2021, the disclosure of which is incorporated by reference herein in its entirety.

FIELD

Embodiments of the present disclosure relate to signaling of audio mixing gains for Immersive Teleconferencing and Telepresence for Remote Terminals (ITT4RT), and more specifically related to defining a Real-time Transport Protocol (RTP) header extension for signaling all audio mixing gains of a 360-degree background and overlay together using RTP Control Protocol (RTCP) feedback.

BACKGROUND

When an omnidirectional media stream is used, only part of the content corresponding to the user's viewport is rendered, while using a head-mounted display (HMD), giving the user a realistic view of the media stream.

FIG. 1 illustrates a related art scenario (scenario 1) for an immersive teleconference call, where the call is organized among Room A (101), User B (102), and User C (103). As shown in FIG. 1, Room A (101) represents a conference room with an omnidirectional/360-degree camera (104), and User B (102) and User C (103) are remote participants using an HMD and mobile devices, respectively. In this case, participants User B (102) and User C (103) send their viewport orientation to Room A (101), which in turn sends User B (102) and User C (103) the viewport dependent stream.

An extended scenario (scenario 2) is shown in FIG. 2A which includes multiple conference rooms (2a01, 2a02, 2a03, 2a04). User B (2a06) uses an HMD to view a video stream from the 360-degree camera (104), and User C (2a07) uses a mobile device to view the video stream. User B (2a06) and User C (2a07) send their viewport orientation to at least one of the conference rooms (2a01, 2a02, 2a03, 2a04), which in turn sends User B (2a06) and User C (2a07) the viewport dependent stream.

As shown in FIG. 2B, another example scenario (scenario 3) is when the call is set up using an MRF/MCU (2b05) where the Media Resource Function (MRF) and the Media Control Unit (MCU) are multimedia servers that provide media-related functions for bridging terminals in a multi-party conference call. The conference rooms may send their respective videos to the MRF/MCU (2b05). These videos are viewport independent videos, i.e., the entire 360-degree video is sent to the media-server (i.e., the MRF/MCU) irrespective of the user's viewport streaming the particular video. The media server receives the viewport orientation of the users (User B (2b06) and User C (2b07)) and accordingly sends the users the viewport-dependent streams.

Further to scenario 3, the remote users can choose to view one of the available 360-degree videos from the conference rooms (2a01-2a04, 2b01-2b04). In such a case, the user sends the information about the video it would like to stream and its viewport orientation to the conference room or the MRF/MCU (2b05). The user can also trigger switching from one room to another based on the active speaker. The media-server may pause receiving a video stream from any conference room that does not have active users.

ISO 23090-2 defines overlay as a "piece of visual media rendered over omnidirectional video or image item or over a viewport." When any presentation is being shared by any participant in conference room A, besides being displayed in conference room A, this presentation is also broadcasted as a stream to other users (conference rooms 2a02-2a04, 2b02-2b04, User B (2b06), and/or User C (2b07)). This stream can be overlaid on top of the 360-degree video. Additionally, overlays can also be used for 2D streams. A default audio mixing gain for the different audio streams are the audio gains ($r_0, r_1, \ldots, r_N$) for the 360 video (a0) and overlay videos ($a_1, a_2, \ldots, a_N$), respectively, and the audio output equals $r0*a0+r1*a1+ \ldots +rn*an$, where $r_0+r_1+ \ldots +r_N=1$. The receiver or MRF/MCU mixes the audio sources proportionally to their mixing gain.

SUMMARY

One or more example embodiments of the present disclosure provide a system and a method for signaling of audio mixing gains of overlays and a 360-degree video stream together in a single RTP header extension.

According to embodiments, a method for signaling multiple audio mixing gains in a teleconference using Real-time Transport Control Protocol (RTCP) feedback is provided. The method may include receiving an input audio stream from a 360-degree video stream, the input audio stream including mixing gains, declaring an RTCP feedback rate for receiving the mixing gains, based on an allocated bandwidth, and signaling the mixing gains using the declared RTCP feedback rate.

According to embodiments, a device for signaling multiple audio mixing gains in a teleconference using Real-time Transport Control Protocol (RTCP) feedback is provided. The device may include one or more memory configured to store program code and one or more processors configured read the program code and operate as instructed by the program code. The program code including receiving code configured to cause the at least one processor to receive an input audio stream from a 360-degree video stream, the input audio stream including mixing gains, declaring code configured to cause the at least one processor to declare an RTCP feedback rate for receiving the mixing gains, based on an allocated bandwidth, and signaling code configured to cause the at least one processor to signal the mixing gains using the declared RTCP feedback rate.

According to embodiments, a non-transitory computer readable medium for signaling multiple audio mixing gains in a teleconference using Real-time Transport Control Protocol (RTCP) feedback is provided. The computer readable medium may be connected to one or more processors and may be configured to store instructions that, when executed by at least one processor of a device, cause the at least one or more processors to receive an input audio stream from a 360-degree video stream, the input audio stream including mixing gains, declare an RTCP feedback rate for receiving the mixing gains, based on an allocated bandwidth, and signal the mixing gains using the declared RTCP feedback rate.

Additional aspects will be set forth in part in the description that follows and, in part, will be apparent from the description, or may be realized by practice of the presented embodiments of the disclosure.

BRIEF DESCRIPTION OF THE DRAWINGS

The above and other aspects, features, and aspects of embodiments of the disclosure will be more apparent from the following description taken in conjunction with the following accompanying drawings.

DETAILED DESCRIPTION

The present disclosure relates to a method and apparatus for signaling of the audio mixing gains of the overlays and 360-degree video stream together using RTCP feedback.

Figure 1:
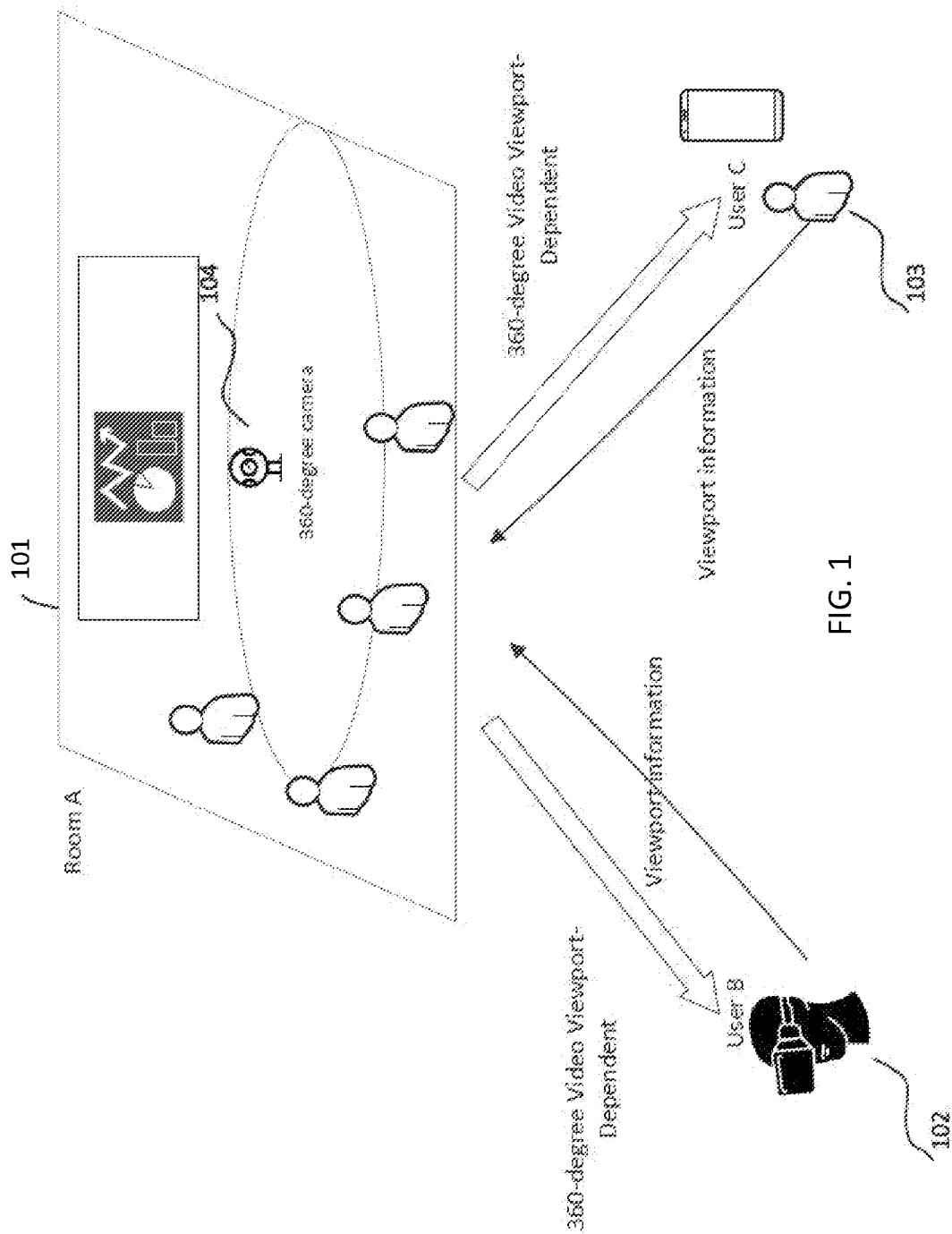
FIG. 1 is a schematic illustration of the ecosystem for immersive teleconferencing.
Figure 2A:
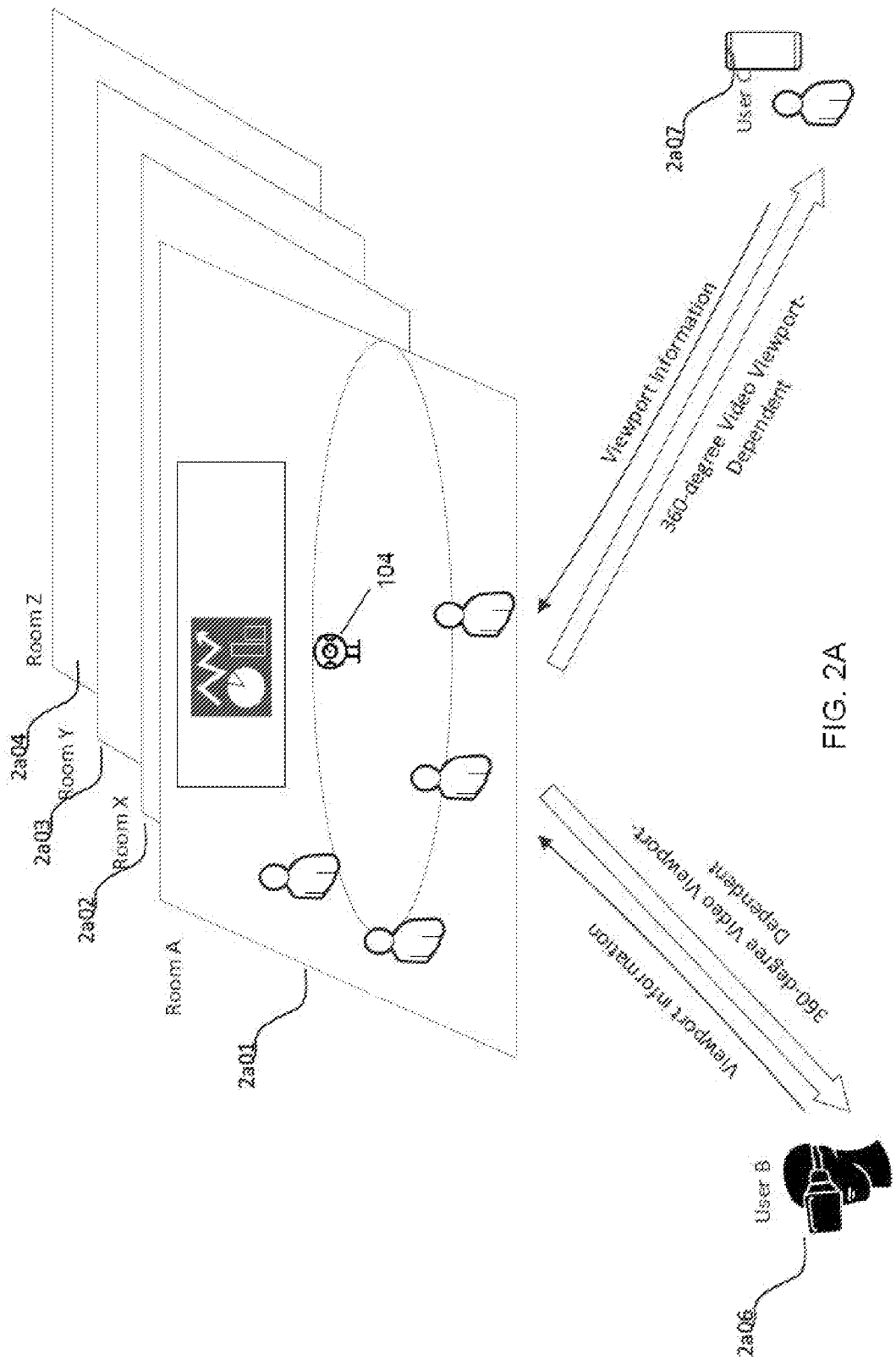
FIG. 2A is a schematic illustration of multiparty multi-conference room teleconferencing.
Figure 2B:
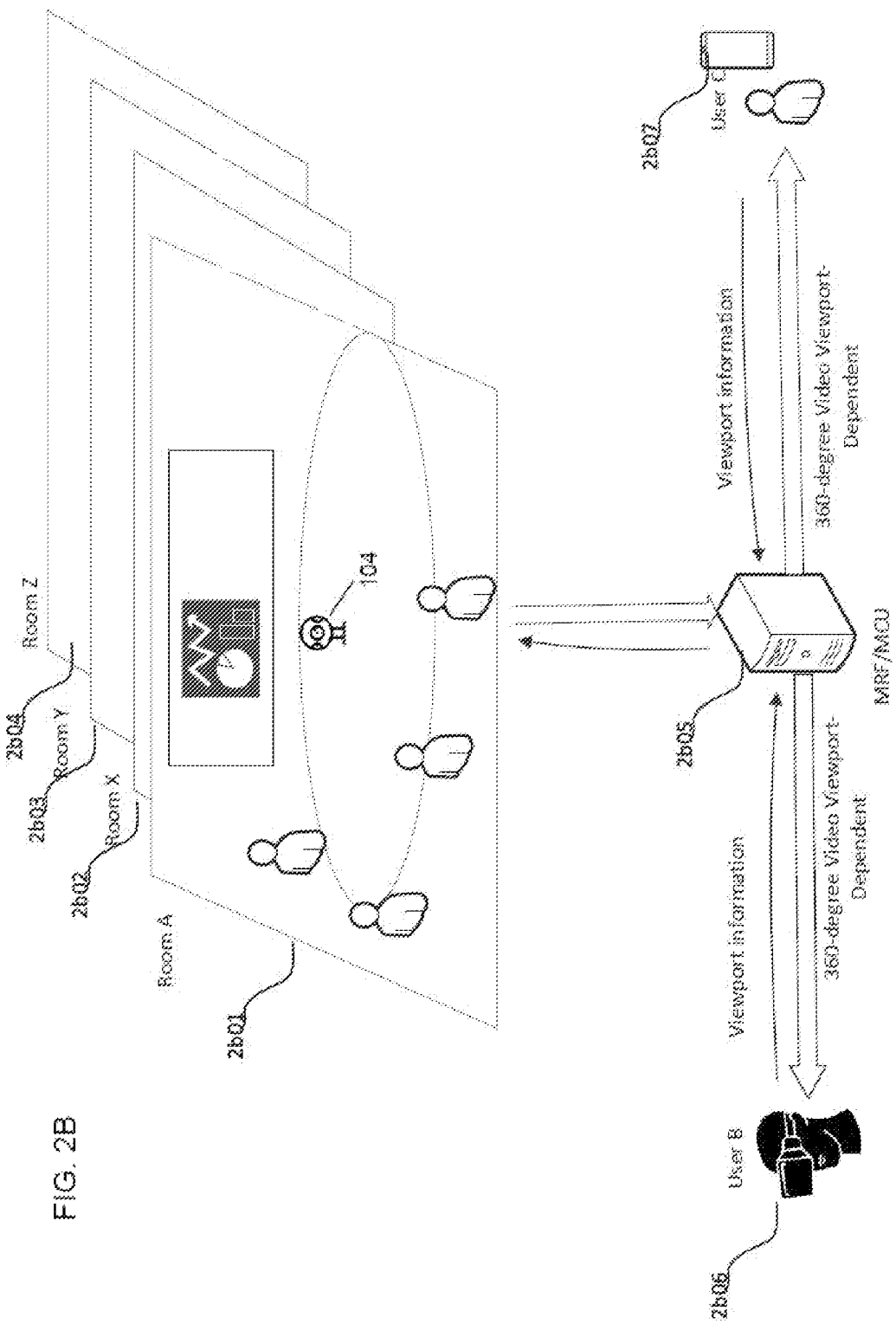
FIG. 2B is a schematic illustration of multiparty multi-conference room teleconferencing using MRF/MCU.

As shown in FIG. 2A and FIG. 2B, multiple conference rooms with an omnidirectional camera are in a teleconference and a user chooses a video/audio stream from one of the conference rooms ($2a01$, $2a02$, $2a03$, $2a04$) to be displayed as immersive stream. Any additional audio or video stream used with the 360-degree immersive stream is sent as an overlay (i.e., as a separate stream). The end device upon receiving multiple audio streams, decodes and mixes them to be rendered to the user. The sender conference room provides the mixing gain levels of all the different audio streams. The sender conference room may also update the mixing gain levels of the different audio streams during the teleconference session. The audio mixing gain may be defined for each audio stream. Thus, it would be desirable to use a method of sending/receiving all audio gains ($r_0, r_1, \ldots, r_N$) and the overlay videos ($a_1, a_2, \ldots, a_N$) using a single header extension as detailed in embodiments of the present disclosure.

Embodiments of the present disclosure are described comprehensively with reference to the accompanying drawings. However, the examples of implementations may be implemented in various multiple forms, and the disclosure should not be construed as being limited to the examples described herein. Conversely, the examples of implementations are provided to make the technical solution of the disclosure more comprehensive and complete, and comprehensively convey the idea of the examples of the implementations to a person skilled in the art. The accompanying drawings are merely example illustrations of the disclosure and are not necessarily drawn to scale. A same reference numeral in the accompanying drawings represents same or similar components, and therefore repeated descriptions of the components are omitted.

The proposed features discussed below may be used separately or combined in any order. Some block diagrams shown in the accompany drawings are functional entities and do not necessarily correspond to physically or logically independent entities. Further, the embodiments may be implemented by processing circuitry (e.g., one or more processors or one or more integrated circuits) or implemented in the form of software, or implemented in different networks and/or processor apparatuses and/or microcontroller apparatuses. In one example, the one or more processors execute a program that is stored in a non-transitory computer-readable medium.

Figure 3:
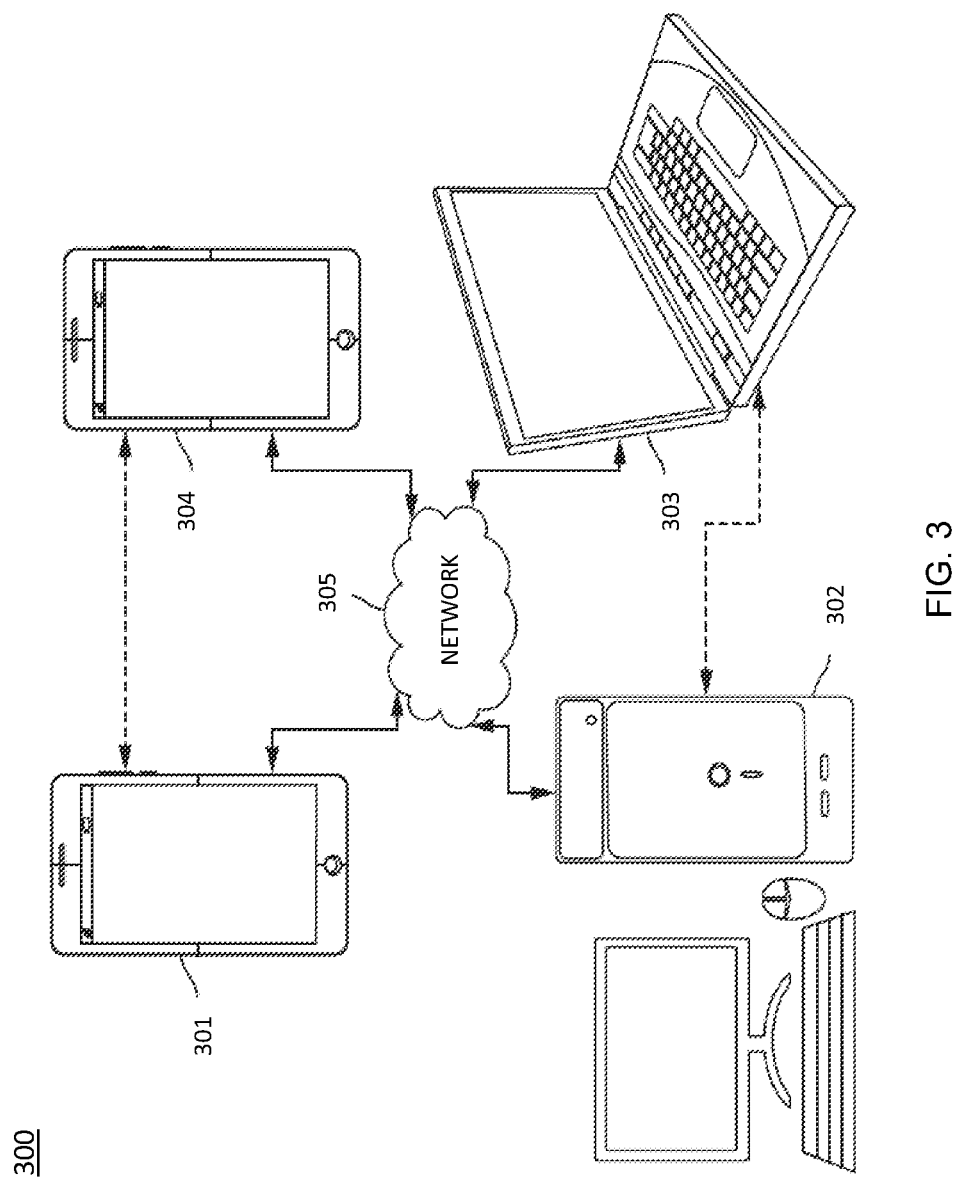
FIG. 3 is a simplified block diagram of a communication system, according to one or more embodiments.

FIG. 3 is a simplified block diagram of a communication system (300) according to embodiments of the present disclosure. The communication system (300) may include at least two terminals (302, 303) interconnected via a network (305). For unidirectional transmission of data, a first terminal (303) may code video data at a local location for transmission to the other terminal (302) via the network (305). The second terminal (302) may receive the coded video data of the other terminal from the network (305), decode the coded data and display the recovered video data. Unidirectional data transmission may be common in media serving applications such as teleconferencing and the like.

FIG. 3 illustrates a second pair of terminals (301, 304) provided to support bidirectional transmission of coded video that may occur, for example, during videoconferencing. For bidirectional transmission of data, each terminal (301, 304) may code video data captured at a local location for transmission to the other terminal via the network (305). Each terminal (301, 304) also may receive the coded video data transmitted by the other terminal, may decode and mix the coded data and may display the recovered video data at a local display device.

In FIG. 3, the terminals (301, 302, 303, 304) may be illustrated as servers, personal computers, and mobile devices but the principles of the present disclosure are not limited to this. Embodiments of the present disclosure find application with laptop computers, tablet computers, HMDs, other media players, and/or dedicated video conferencing equipment. The network (305) represents any number of networks that convey coded video data among the terminals (301, 302, 303, 304), including for example wireline and/or wireless communication networks. The communication network (305) may exchange data in circuit-switched and/or packet-switched channels. Representative networks include telecommunications networks, local area networks, wide area networks and/or the Internet. Mixing gains discussed in embodiments of the present disclosure may be sent and received using network protocols explained herein below via the network (305) or the like.

Figure 4:
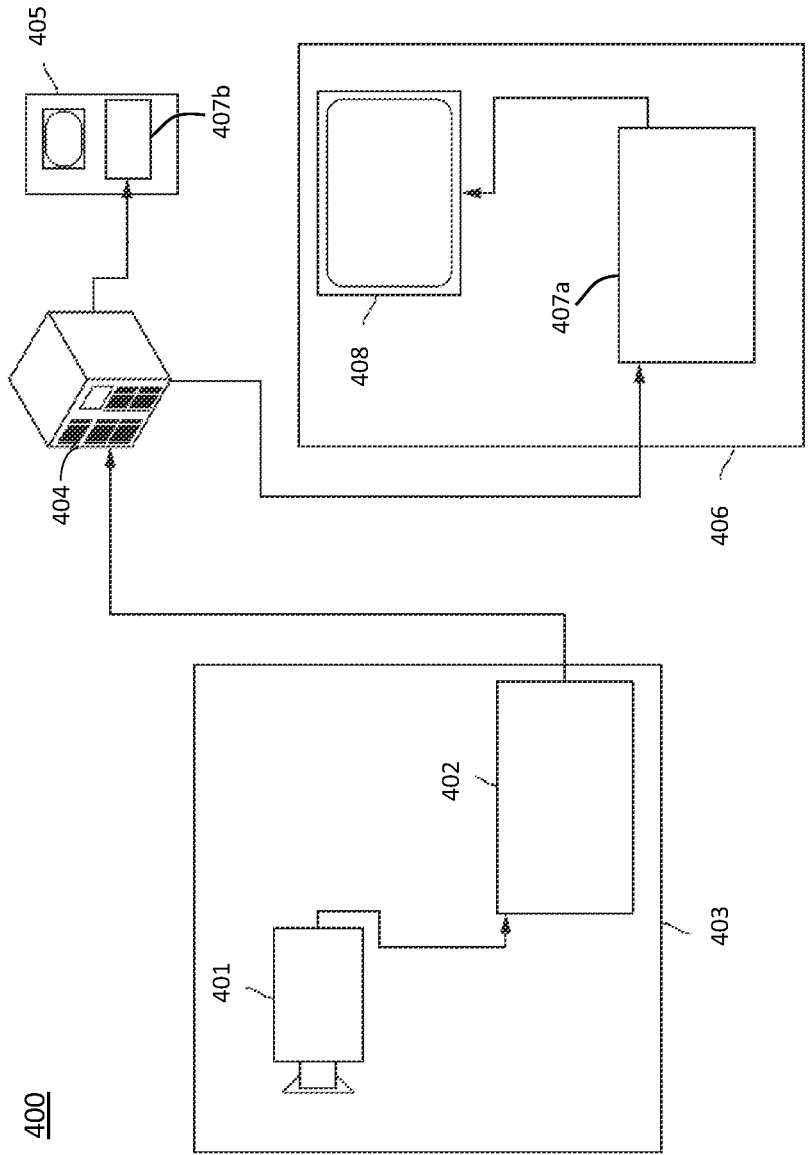
FIG. 4 is a simplified example illustration of a streaming environment, according to one or more embodiments.

FIG. 4 illustrates an example streaming environment for an application for the disclosed subject matter. The disclosed subject matter can be equally applicable to other video enabled applications, including, for example, immersive teleconferencing call, video teleconferencing and telepresence, and so on.

A streaming environment may include one or more conference rooms (403), that may include a video source (401), for example a video camera and one or more participants of the conference (402). The video source (401) illustrated in FIG. 4 is a 360-degree video camera that may, for example, create a video sample stream. The video sample stream may be sent to and/or stored on a streaming server (404) for future use. One or more streaming clients (405, 406) may also send their respective viewport information to the streaming server (404). Based on the viewport information, the streaming server (404) may send a viewport dependent stream to the corresponding streaming clients (405, 406). In another example embodiment, the streaming clients (405, 406) may access the streaming server (404) to retrieve the viewport dependent stream. The streaming server (404) and/or streaming clients (405, 406) may include hardware, software, or a combination thereof to enable or implement aspects of the disclosed subject matter as described in more detail below.

In an immersive teleconferencing call, multiple audio streams may be transmitted from the sender (e.g., 403) to the streaming client (e.g., 405 and/or 406). These streams may include audio streams for the 360-degree video as well as one or multiple audio streams for the overlays. The streaming clients (405, 406) may include mixing components (407a, 407b). The mixing components may decode and mix the viewport dependent stream of the 360-degree video and overlays, and create an outgoing video sample stream that can be rendered on a display 408 or other rendering device such as an HDM, speaker, mobile device, and so on. Embodiments are not limited to this configuration, the one or more conference rooms (403) may communicate with the streaming clients (405, 406) via a network (e.g., network 305).

Signaling multiple audio mixing gains from the server to the streaming client via RTCP feedback packets will now be described according to embodiments.

The streaming client (hereafter "receiver") may indicate its capability of receiving audio gain using an the following Session Description Protocol (SDP) attribute:

$a=rtcp\text{-}fb$:*audio-mixing-gain

The receiver may define the RTCP feedback frequency capabilities using the SDP. In the same or another embodiment, the RTCP feedback may be sent by the server either at a constant or variable rate. When the RTCP feedback is sent at a constant rate, the RTCP feedback may also include other information such as viewport orientation information along with ordinary RTCP reports. In this case, the server follows the standard 5% bandwidth allocated for RTCP traffic (without the 5 seconds minimum RTCP transmission interval, as allowed by RTP/AVPF profile). Table 1 shows the RTCP feedback frequency sufficient to send the audio gain, assuming RTCP packets of 96 bytes, including audio and RTCP feedback bite rate requirements.

TABLE 1

| Audio bit rate (Kbps) | RTCP feedback bit rate (Kbps) | RTCP feedback frequency |
| --- | --- | --- |
| 96 | 4.8 | 160 ms |
| 160 | 8 | 96 ms |
| 320 | 16 | 48 ms |
| 640 | 32 | 24 ms |
| 1411 | 70.55 | 10 ms |

In the same or another example embodiment, the audio gain sent (via the RTCP feedback) may be sent by the server based on event-based feedbacks (i.e., sending RTCP feedback at a variable rate). In this case, the RTCP feedback of the audio gain may be given immediately in the event that any of the audio mixing gain changes. In the same or another example embodiment, the receiver may define a bandwidth different from the standard 5%.

The receiver may send event-based immediate feedback as long as the following condition is satisfied:

Events per interval<=RTCP allocated bandwidth/Avg
    RTCP packet size       (1)

Events per interval=Avg number of events reported/
    Time interval       (2)

For audio, the event-based feedback interval may be sent whenever the audio mixing gain changes. Therefore, to follow the standard 5% bandwidth allocated for the RTCP traffic allowed, the server does not trigger event-based immediate feedbacks for intervals smaller than $T_E$, where:

$T_E$=>Avg RTCP packet size/RTCP allocated bandwidth       (3)

Figure 5:
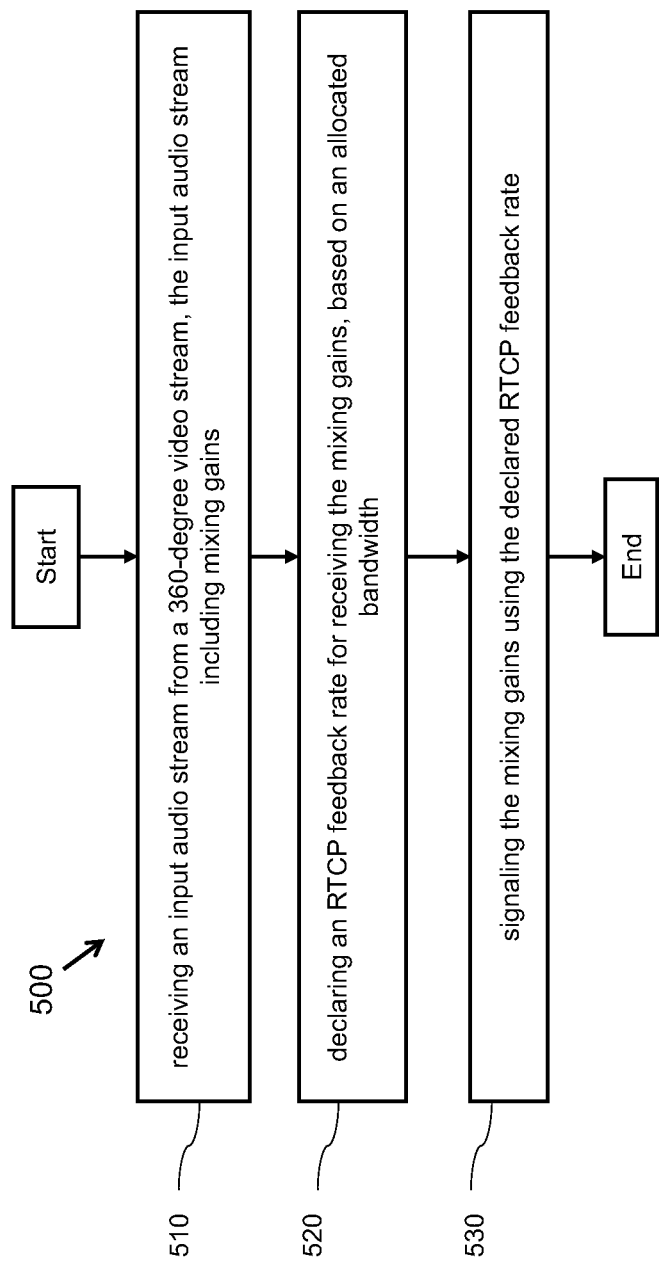
FIG. 5 is a flowchart of a method for signaling multiple audio mixing gains using RTCP feedback, according to one or more embodiments.

FIG. 5 is a flowchart of a method 500 for signaling multiple audio mixing gains using RTCP feedback, according to one or more embodiments.

As shown in FIG. 5, in operation 510, the method 500 includes receiving an input audio stream from a 360-degree video stream, the input audio stream including mixing gains. The mixing gains include audio gains from the input audio stream and audio gains from overlay audio streams.

In operation 520, the method 500 includes declaring an RTCP feedback rate for receiving the mixing gains, based on an allocated bandwidth. The RTCP feedback rate may be a constant feedback rate or an event-based feedback rate. The event-based rate is only triggered for event intervals based on an average RTCP packet size and the allocated bandwidth In operation 530, the method 500 includes signaling the mixing gains using the declared RTCP feedback rate.

Although FIG. 5 shows example blocks of the method, in some implementations, the method may include additional blocks, fewer blocks, different blocks, or differently arranged blocks than those depicted in FIG. 5. Additionally, or alternatively, two or more of the blocks of the method may performed in parallel.

The techniques for signaling multiple audio mixing gains for teleconferencing and telepresence using RTCP feedback described above may be implemented as computer software using computer-readable instructions and physically stored in one or more computer-readable media. For example, FIG. 6 shows a computer system 600 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
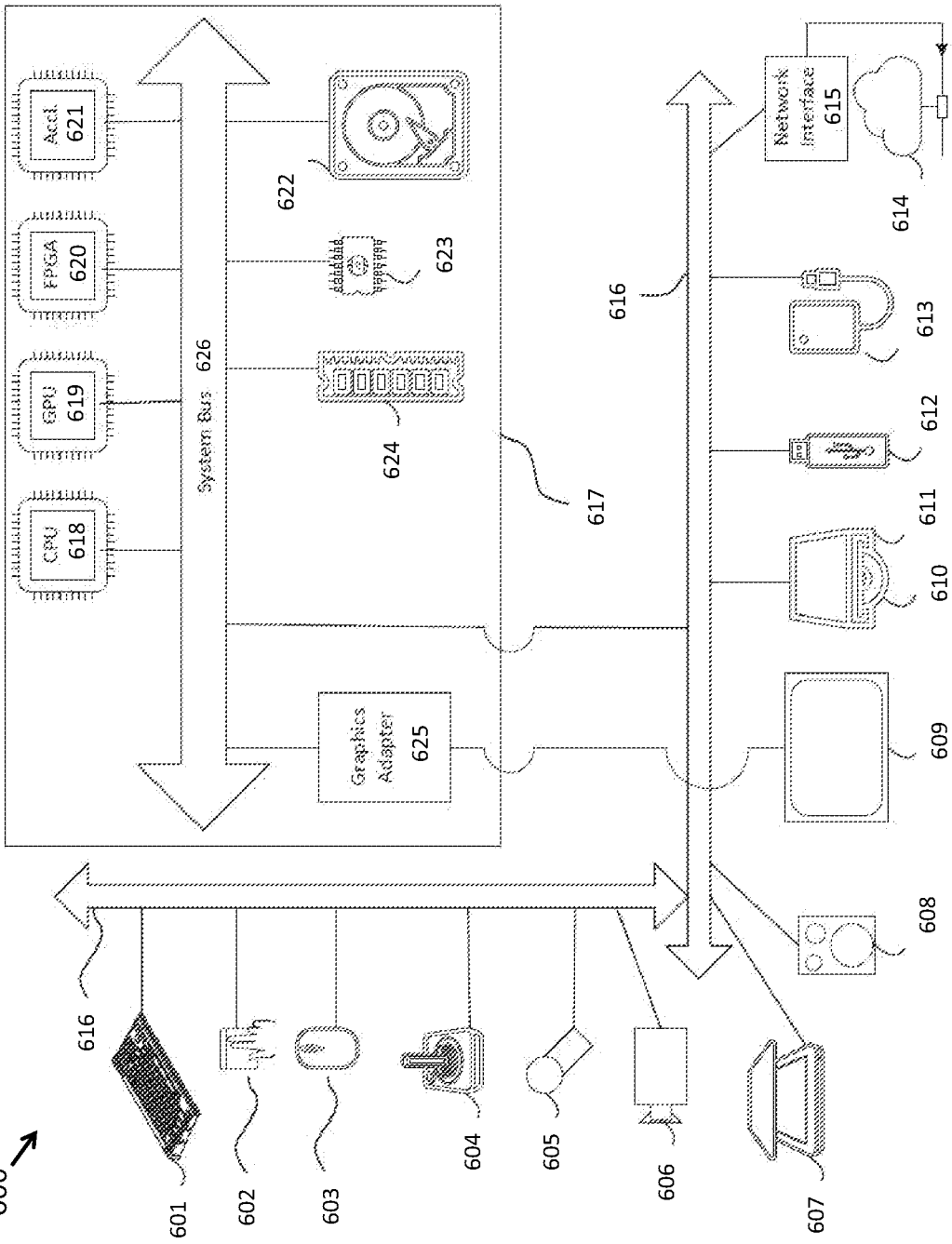
FIG. 6 is a schematic illustration of a computer system, according to one or more embodiments.

The components shown in FIG. 6 for computer system 600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 600.

Computer system 600 may include certain human interface input devices. Such a human interface input device may be responsive to input by one or more human users through, for example, tactile input (such as keystrokes, swipes, data glove movements), audio input (such as voice, clapping), visual input (such as gestures), olfactory input. The human interface devices can also be used to capture certain media not necessarily directly related to conscious input by a human, such as audio (such as speech, music, ambient sound), images (such as scanned images, photographic images obtained from a still image camera), video (such as two-dimensional video, three-dimensional video including stereoscopic video).

Input human interface devices may include one or more of (only one of each depicted): keyboard 601, trackpad 602, mouse 603, touch-screen 609, data-glove, joystick 604, microphone 605, camera 606, scanner 607.

Computer system 600 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 609, data-glove, or joystick 604, but there can also be tactile feedback devices that do not serve as input devices), audio output devices (such as: speakers 608, headphones), visual output devices (such as screens 609 to include CRT screens, LCD screens, plasma screens, OLED screens, each with or without touch-screen input capability, each with or without tactile feedback capability—some of which may be capable to output two-dimensional visual output or more than three-dimensional output through means such as stereographic output; virtual-reality glasses, holographic displays and smoke tanks), and printers.

Computer system 600 can also include human accessible storage devices and their associated media such as optical media including CD/DVD ROM/RW 611 with CD/DVD or the like media 610, thumb-drive 612, removable hard drive or solid-state drive 613, legacy magnetic media such as tape and floppy disc, specialized ROM/ASIC/PLD based devices such as security dongles, and the like.

Those skilled in the art should also understand that term "computer-readable media" as used in connection with the presently disclosed subject matter does not encompass transmission media, carrier waves, or other transitory signals.

Computer system 600 can also include an interface 615 to one or more communication networks 614. Networks 614 can, for example, be wireless, wireline, optical. Networks 614 can further be local, wide-area, metropolitan, vehicular and industrial, real-time, delay-tolerant, and so on. Examples of networks 614 include local area networks such as Ethernet, wireless LANs, cellular networks to include GSM, 3G, 4G, 5G, LTE, and the like, TV wireline or wireless wide-area digital networks to include cable TV, satellite TV, and terrestrial broadcast TV, vehicular and industrial to include CANBus, and so forth. Certain networks 614 commonly require external network interface adapters (e.g., graphics adapter 625) that attached to certain general-purpose data ports or peripheral buses 616 (such as, for example, USB ports of the computer system 600; others are commonly integrated into the core of the computer system 600 by attachment to a system bus as described below (for example Ethernet interface into a PC computer system or cellular network interface into a smartphone computer system). Using any of these networks 614, computer system 600 can communicate with other entities. Such communication can be uni-directional, receive only (for example, broadcast TV), uni-directional send-only (for example, CANbus to certain CANbus devices), or bi-directional, for example to other computer systems using local or wide area digital networks. Certain protocols and protocol stacks can be used on each of those networks and network interfaces, as described above.

The aforementioned human interface devices, human-accessible storage devices, and network interfaces can be attached to a core 617 of the computer system 600.

The core 617 can include one or more Central Processing Units (CPU) 618, Graphics Processing Units (GPU) 619, specialized programmable processing units in the form of Field Programmable Gate Areas (FPGA) 620, hardware accelerators 621 for certain tasks, and so forth. These devices, along with Read-only memory (ROM) 623, Random-access memory (RAM) 624, internal mass storage such as internal non-user accessible hard drives, SSDs, and the like 622, may be connected through a system bus 626. In some computer systems, the system bus 626 can be accessible in the form of one or more physical plugs to enable extensions by additional CPUs, GPU, and the like. The peripheral devices can be attached either directly to the core's system bus 626, or through a peripheral bus 616. Architectures for a peripheral bus include PCI, USB, and the like.

CPUs 618, GPUs 619, FPGAs 620, and accelerators 621 can execute certain instructions that, in combination, can make up the aforementioned computer code. That computer code can be stored in ROM 623 or RAM 624. Transitional data can be also be stored in RAM 624, whereas permanent data can be stored, for example, in the internal mass storage 622. Fast storage and retrieval to any of the memory devices can be enabled through the use of cache memory, which can be closely associated with one or more CPU 618, GPU 619, mass storage 622, ROM 623, RAM 624 and the like.

The computer-readable media can have computer code thereon for performing various computer-implemented operations. The media and computer code can be specially designed and constructed for the purposes of the present disclosure, or they can be of the kind well known and available to those having skill in the computer software arts.

As an example and not by way of limitation, the computer system having architecture 600, and specifically the core 617 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 617 that are of non-transitory nature, such as core-internal mass storage 622 or ROM 623. The software implementing various embodiments of the present disclosure can be stored in such devices and executed by core 617. A computer-readable medium can include one or more memory devices or chips, according to particular needs. The software can cause the core 617 and specifically the processors therein (including CPU, GPU, FPGA, and the like) to execute particular processes or particular parts of particular processes described herein, including defining data structures stored in RAM 624 and modifying such data structures according to the processes defined by the software. In addition or as an alternative, the computer system can provide functionality as a result of logic hardwired or otherwise embodied in a circuit (for example, accelerator 621), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for signaling multiple audio mixing gains in a teleconference using Real-time Transport Control Protocol (RTCP) feedback, performed by at least one processor and comprising:
   receiving an input audio stream from a 360-degree video stream, the input audio stream including mixing gains;
   declaring an RTCP feedback rate, which indicates a frequency of a trigger of initiating an RTCP feedback and comprises a different bitrate than a streaming of the input audio stream, for receiving the mixing gains, based on an allocated bandwidth; and
   signaling the mixing gains using the declared RTCP feedback rate, wherein
   a receiver of the input audio stream indicates a capability of receiving the audio mixing gains using a Session Description Protocol (SDP) attribute: a=rtcp–fb: * audio-mixing-gain,
   the receiver is configured to send event-based immediate feedback based on determining that events per interval are at least one of
      less than or equal to a ratio of an RTCP allocated bandwidth to an average RTCP packet size, and
      equal to an average number of events reported per time interval, and
   the event-based immediate feedback is determined to not be triggered for intervals smaller than an interval equal to or less than a ratio of the average RTCP packet size to the RTCP allocated bandwidth.

2. The method of claim 1, wherein the mixing gains include first audio gains from the input audio stream and second audio gains from overlay audio streams.

3. The method of claim 1, wherein the RTCP feedback rate is a constant rate which indicates that the trigger, of initiating the RTCP feedback, comprises a periodicity of the RTCP feedback according to the constant rate.

4. The method of claim 1, wherein the RTCP feedback rate is an event-based rate which indicates that the trigger, of initiating the RTCP feedback, comprises a detection of an event.

5. The method of claim 4, wherein the event-based rate is only triggered for event intervals greater than or equal to T,
   wherein T is based on an average RTCP packet size and the allocated bandwidth.

6. The method of claim 4, further comprising signaling the mixing gains using the event-based rate based on a change in the mixing gains.

7. A device for signaling multiple audio mixing gains in a teleconference using Real-time Transport Control Protocol (RTCP) feedback, the device comprising:
   at least one memory configured to store program code; and
   at least one processor configured to read the program code and operate as instructed by the program code, the program code including:
   receiving code configured to cause the at least one processor to receive an input audio stream from a 360-degree video stream, the input audio stream including mixing gains;
   declaring code configured to cause the at least one processor to declare an RTCP feedback rate, which indicates a frequency of a trigger of initiating an RTCP feedback and comprises a different bitrate than a streaming of the input audio stream, for receiving the mixing gains, based on an allocated bandwidth; and
   signaling code configured to cause the at least one processor to signal the mixing gains using the declared RTCP feedback rate, wherein
   a receiver of the input audio stream indicates a capability of receiving the audio mixing gains using a Session Description Protocol (SDP) attribute: a=rtcp–fb: * audio-mixing-gain,
   the receiver is configured to send event-based immediate feedback based on determining that events per interval are at least one of
      less than or equal to a ratio of an RTCP allocated bandwidth to an average RTCP packet size, and
      equal to an average number of events reported per time interval, and
   the event-based immediate feedback is determined to not be triggered for intervals smaller than an interval equal to or less than a ratio of the average RTCP packet size to the RTCP allocated bandwidth.

8. The device of claim 7, wherein the mixing gains include first audio gains from the input audio stream and second audio gains from overlay audio streams.

9. The device of claim 7, wherein the RTCP feedback rate is a constant rate which indicates that the trigger, of initiating the RTCP feedback, comprises a periodicity of the RTCP feedback according to the constant rate.

10. The device of claim 7, wherein the RTCP feedback rate is an event-based rate which indicates that the trigger, of initiating the RTCP feedback, comprises a detection of an event.

11. The device of claim 10, wherein the event-based rate is only triggered for event intervals greater than or equal to T,
    wherein T is based on an average RTCP packet size and the allocated bandwidth.

12. The device of claim 10, wherein the signaling code is further configured to cause the at least one processor to signal the mixing gains using the event-based rate based on a change in the mixing gains.

13. A non-transitory computer readable medium storing instructions, the instructions comprising: one or more instructions that, when executed by at least one processor of a device for signaling multiple audio mixing gains in a teleconference using Real-time Transport Control Protocol (RTCP) feedback storing instructions that, cause the at least one processor to:
   receive an input audio stream from a 360-degree video stream, the input audio stream including mixing gains;
   declare an RTCP feedback rate, which indicates a frequency of a trigger of initiating an RTCP feedback and comprises a different bitrate than a streaming of the input audio stream, for receiving the mixing gains, based on an allocated bandwidth; and
   signal the mixing gains using the declared RTCP feedback rate, wherein
   a receiver of the input audio stream indicates a capability of receiving the audio mixing gains using a Session Description Protocol (SDP) attribute: a=rtcp–fb: * audio-mixing-gain,
   the receiver is configured to send event-based immediate feedback based on determining that events per interval are at least one of
      less than or equal to a ratio of an RTCP allocated bandwidth to an average RTCP packet size, and equal to an average number of events reported per time interval, and the event-based immediate feedback is determined to not be triggered for intervals smaller than an interval equal to or less than a ratio of the average RTCP packet size to the RTCP allocated bandwidth.

14. The non-transitory computer readable medium of claim 13, wherein the mixing gains include audio gains from the input audio stream and audio gains from overlay audio streams.

15. The non-transitory computer readable medium of claim 13, wherein the RTCP feedback rate is a constant rate which indicates that the trigger, of initiating the RTCP feedback, comprises a periodicity of the RTCP feedback according to the constant rate.

16. The non-transitory computer readable medium of claim 13, wherein the RTCP feedback rate is an event-based rate, and the event-based rate is only triggered for event intervals greater than or equal to T, wherein T is based on an average RTCP packet size and the allocated bandwidth.

17. The non-transitory computer readable medium of claim 16, wherein the instructions, when executed by the at least one processor, further causes the at least one processor to signal the mixing gains using the event-based rate based on a change in the mixing gains.

* * * * *